UNITED STATES PATENT OFFICE.

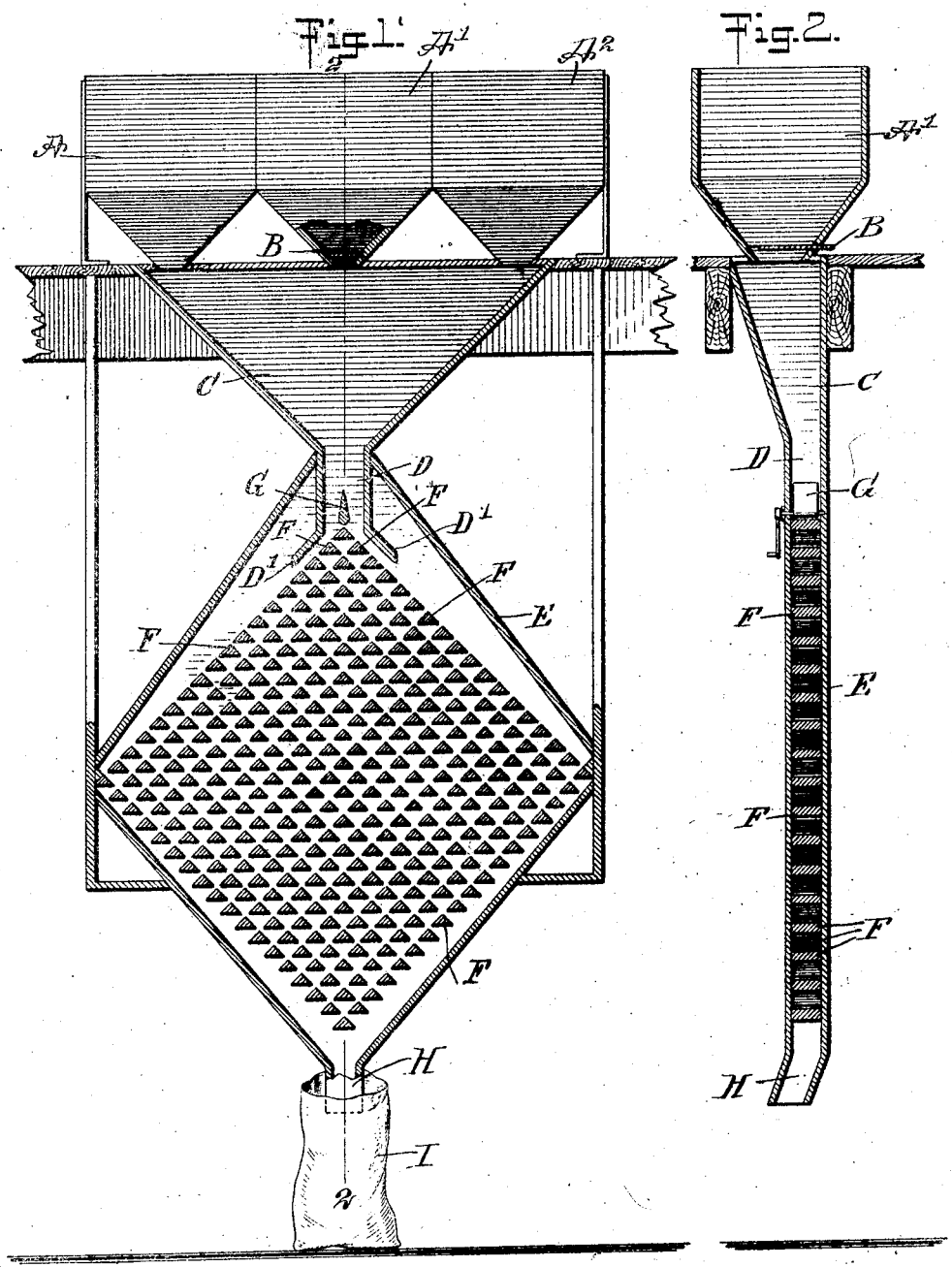

PERCY M. LYONS, OF GUEYDAN, LOUISIANA.

MIXER.

No. 832,400.　　　Specification of Letters Patent.　　　Patented Oct. 2, 1906.

Application filed February 10, 1906. Serial No. 300,462.

*To all whom it may concern:*

Be it known that I, PERCY M. LYONS, a citizen of the United States, and a resident of Gueydan, in the parish of Vermilion and State of Louisiana, have invented a new and Improved Mixer, of which the following is a full, clear, and exact description.

The object of the invention is to provide a new and improved mixer, more especially designed for mixing or blending different grades of rice and other cereals in a very simple and effective manner and without the use of power-driven expensive machinery.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in both the views.

Figure 1 is a sectional side elevation of the improvement, and Fig. 2 is a transverse section of the same on the line 2 2 of Fig. 1.

A plurality of feed-hoppers A, A', and A² for containing the different grades of rice or other materials are provided in their lower ends with gates B under the control of the operator for regulating the amount of the material flowing from any one of the hoppers A, A', or A² into a receiving-hopper C, provided at its bottom with an outlet D for discharging the materials into a mixing-chamber E, having transversely-extending spaced bars F, forming passages for the materials to insure intimate mixing thereof, as hereinafter more fully explained.

The mixing-chamber E is preferably in the form of a lozenge, as plainly illustrated in Fig. 1, and the bars F are triangular in cross-section and confined within a lozenge-shaped figure, the sides of which are spaced from the side walls of the mixing-chamber E, as will be readily understood by reference to Fig. 1.

In the outlet D of the receiving-hopper C is arranged a manually-controlled gate G for controlling the flow of the materials into the mixing-chamber E and to the bars F thereof, and the lower end of the said outlet D is provided with downwardly and outwardly extending flanges D', arranged parallel to the upper sides of the lozenge-shaped figure containing the bars F. The lower end of the mixing-chamber E is provided with an outlet-spout H for directing the mixed and blended materials into a bag I or other suitable receptacle.

By reference to Fig. 1 it will be seen that the uppermost bars F extend into the lower end of the outlet D, and the top bar F is directly under the bottom of the gate G, so that the materials flowing down the receiving-hopper C and its outlet D pass onto the bars F, which are spaced sufficiently far apart to form passages for the materials—that is, to allow the materials to flow downward and deflect the same sidewise, to insure a proper mixture of the different grades of materials, with a view to thoroughly mix or blend the same. As shown in Fig. 1, the bars F are arranged in horizontal rows, and the bars in one row alternate with the bars in the next row above or below, so that sufficient space is formed between two bars in one row and the bar above in the next adjacent row to allow the materials to converge toward each other, and thereby insure intimate mixture or blending of the same.

As the several devices described are located one above the other, it is evident that the materials flow by their own gravity in a downward direction, and hence no power-driven or expensive machinery is required for producing the desired result.

The mixer is very simple and durable in construction and is composed of comparatively few parts not liable to get easily out of order.

It is understood that by the use of the gates B in the several feed-hoppers A, A', and A² more or less of any one of the materials in the hoppers can be discharged into the receiving-hopper C, according to the desired grade of the mixture to be obtained.

Having thus described my invention, I claim as new and desire to secure by Letters Patent—

1. A mixer comprising a plurality of feed-hoppers, a receiving-hopper into which discharge the feed-hoppers, a mixing-chamber into which discharges the receiving-hopper, the said mixing-chamber having spaced bars forming passages for the material to be mixed, and an outlet at the bottom thereof, the side walls of the mixing-chamber being in the form of a lozenge-shaped figure, and the said bars being triangular in cross-section and confined in a lozenge-shaped figure, the sides of which are spaced from the side walls of the said mixing-chamber, means for controlling the flow of the material from the feed-hoppers into the receiving-hopper, and means for controlling the flow of material from the receiving-hopper into the mixing-chamber.

2. A mixer comprising a plurality of feed-hoppers, a receiving-hopper into which discharge the said feed-hoppers, a mixing-chamber into which discharges the said receiving-hopper, the said mixing-chamber having spaced bars forming passages for the material to be mixed, and an outlet at the bottom of the said mixing-chamber, the side walls of which are in the form of a lozenge-shaped figure, and the said bars being triangular in cross-section and confined within a lozenge-shaped figure, the sides of which are spaced from the side walls of the said mixing-chamber.

3. A mixer comprising a plurality of feed-hoppers, a receiving-hopper into which discharge the said feed-hoppers, a mixing-chamber into which discharges the said receiving-hopper, the said mixing-chamber having spaced bars forming passages for the material to be mixed, and an outlet at the bottom of the said mixing-chamber, the side walls of which are in the form of a lozenge-shaped figure, and the said bars being triangular in cross-section and confined within a lozenge-shaped figure, the sides of which are spaced from the side walls of the said mixing-chamber, the outlet of the said receiving-chamber having angular flanges parallel to the upper sides of the said lozenge-shaped figure.

4. A mixer comprising a plurality of feed-hoppers, a receiving-hopper into which discharge the said feed-hoppers, a mixing-chamber into which discharges the said receiving-hopper, the said mixing-chamber having spaced bars forming passages for the material to be mixed, an outlet at the bottom of the said mixing-chamber, the side walls of which are in the form of a lozenge-shaped figure, and the said bars being triangular in cross-section and confined within a lozenge-shaped figure, the sides of which are spaced from the side walls of the said mixing-chamber, the outlet of the said receiving-chamber having angular flanges parallel to the upper sides of the said lozenge-shaped figure, and a gate in the outlet of the said receiving-chamber.

In testimony whereof I have signed my name to this specification in the presence of two subscribing witnesses.

PERCY M. LYONS.

Witnesses:
H. C. BURT,
D. B. WIGGINS.